(12) United States Patent
Kulkarni et al.

(10) Patent No.: US 8,767,747 B2
(45) Date of Patent: Jul. 1, 2014

(54) METHOD FOR TRANSFERRING DATA PACKETS IN A COMMUNICATION NETWORK AND SWITCHING DEVICE

(75) Inventors: Vivek Kulkarni, Unterhaching (DE); Matthias Scheffel, Unterhaching (DE)

(73) Assignee: Siemens Aktiengesellschaft, Munich (DE)

( * ) Notice: Subject to any disclaimer, the term of this patent is extended or adjusted under 35 U.S.C. 154(b) by 312 days.

(21) Appl. No.: 13/058,221

(22) PCT Filed: Aug. 24, 2009

(86) PCT No.: PCT/EP2009/060852
§ 371 (c)(1),
(2), (4) Date: Feb. 9, 2011

(87) PCT Pub. No.: WO2010/026067
PCT Pub. Date: Mar. 11, 2010

(65) Prior Publication Data
US 2011/0142052 A1   Jun. 16, 2011

(30) Foreign Application Priority Data
Aug. 25, 2008  (DE) .......... 10 2008 039 580

(51) Int. Cl.
*H04L 12/28* (2006.01)
*H04L 12/56* (2006.01)
*H04L 29/08* (2006.01)

(52) U.S. Cl.
CPC ........... *H04L 47/24* (2013.01); *H04L 67/322* (2013.01)
USPC .................................. 370/395.42

(58) Field of Classification Search
CPC .............................. H04L 47/24; H04L 67/322
USPC ............. 370/230.1, 236, 255, 389, 392, 394, 370/395.42, 401, 412, 411, 474; 709/235, 709/240, 238
See application file for complete search history.

(56) References Cited

U.S. PATENT DOCUMENTS 4,707,831 A    11/1987  Weir et al. ................. 370/94
4,982,430 A *   1/1991  Frezza et al. ............... 380/211
(Continued)

FOREIGN PATENT DOCUMENTS

CN   1402478 A   3/2003   ............. H04L 12/56
EP   0582537 A2  2/1994   ............. H04L 29/06
(Continued)

OTHER PUBLICATIONS

International PCT Search Report and Written Opinion, PCT/EP2009/060852, 16 pages, Mailed Dec. 17, 2009.

Primary Examiner — Hassan Phillips
Assistant Examiner — Ajay Cattungal
(74) Attorney, Agent, or Firm — King & Spalding L.L.P.

(57) ABSTRACT

In a method for transferring data packets in a communication network, first data packets having a low priority are transferred between a transmitter and a receiver and second data packets having a high priority compared to the first data packets are preferably transferred between them. In a second data packet to be transferred it is checked whether presently a first data packet is being transferred. If yes, the transfer of the first data packet is interrupted or stopped and the second data packet is then transferred. After the transfer of the second data packet, the transfer of the un-transferred first data packet is repeated or the rest of the incompletely transferred first data packet is transferred. Each first data packet is stored in an intermediate memory in parallel with a transmission and is only deleted from the intermediate memory after complete transfer of the first data packet to the receiver.

17 Claims, 4 Drawing Sheets

(56) References Cited

U.S. PATENT DOCUMENTS

| | | | |
|---|---|---|---|
| 5,497,371 A * | 3/1996 | Ellis et al. | 370/412 |
| 6,842,423 B1 | 1/2005 | Erimli et al. | 370/235 |
| 7,298,703 B1 * | 11/2007 | Rose | 370/236 |
| 7,321,596 B2 | 1/2008 | Ohnishi | 370/429 |
| 7,558,269 B2 * | 7/2009 | Le Pennec et al. | 370/395.42 |
| 8,145,787 B1 * | 3/2012 | Rose et al. | 709/235 |
| 2002/0041592 A1 * | 4/2002 | Van Der Zee et al. | 370/389 |
| 2002/0131425 A1 * | 9/2002 | Shalom | 370/401 |
| 2003/0039254 A1 | 2/2003 | Ohnishi | 370/395.42 |
| 2003/0174647 A1 * | 9/2003 | Gutierrez et al. | 370/230 |
| 2005/0175013 A1 * | 8/2005 | Le Pennec et al. | 370/395.42 |
| 2008/0071924 A1 * | 3/2008 | Chilukoor | 709/240 |
| 2011/0142052 A1 | 6/2011 | Kulkarni et al. | 370/392 |

FOREIGN PATENT DOCUMENTS

| | | | |
|---|---|---|---|
| EP | 0726002 | 3/1999 | |
| GB | 2389493 A | 10/2003 | H04M 7/00 |
| WO | 95/12265 | 5/1995 | H04L 12/64 |
| WO | 00/42789 | 7/2000 | H04Q 7/22 |
| WO | 2006/111788 A1 | 10/2006 | H04L 12/56 |
| WO | 2010/026067 A1 | 3/2010 | H04L 12/56 |

* cited by examiner

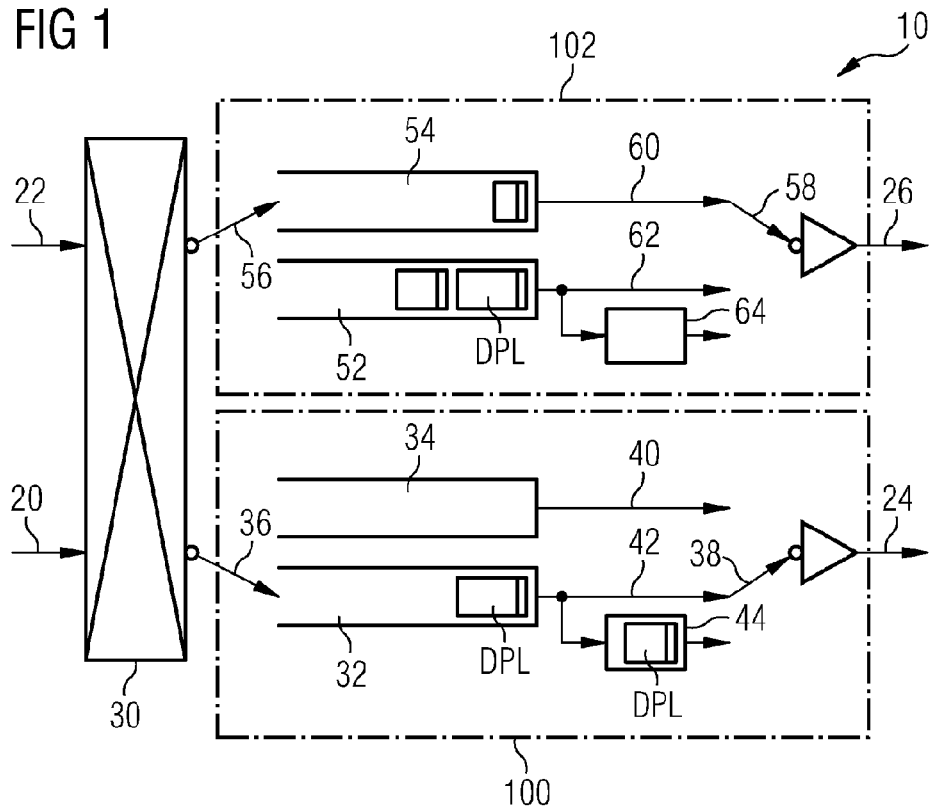
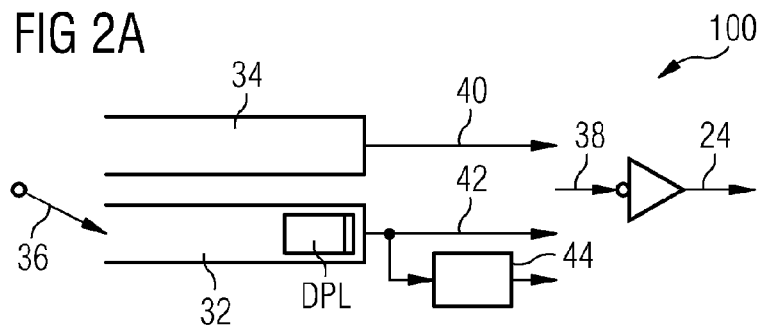
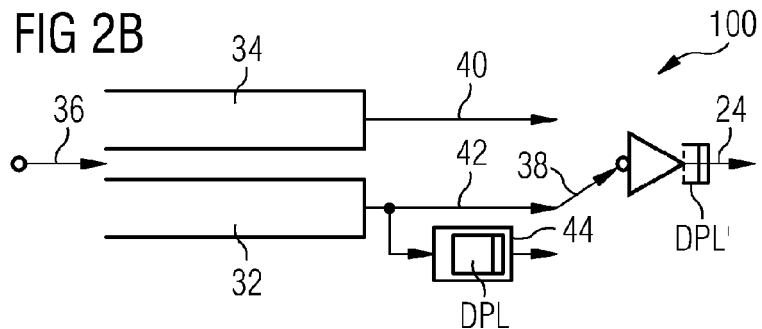

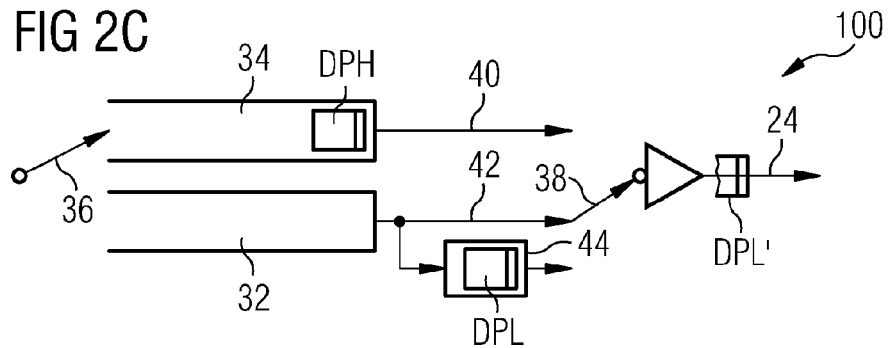
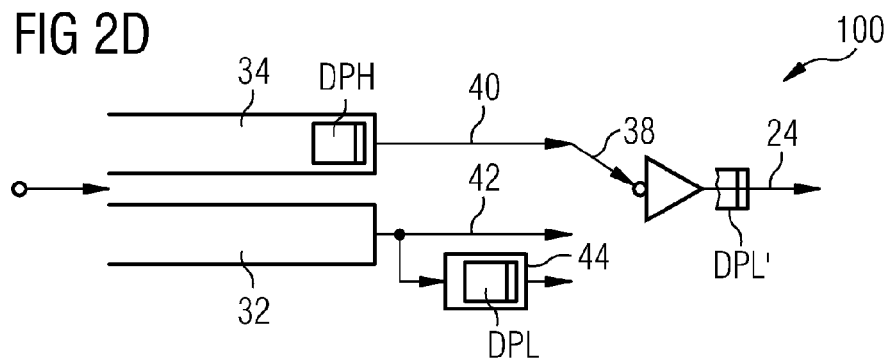
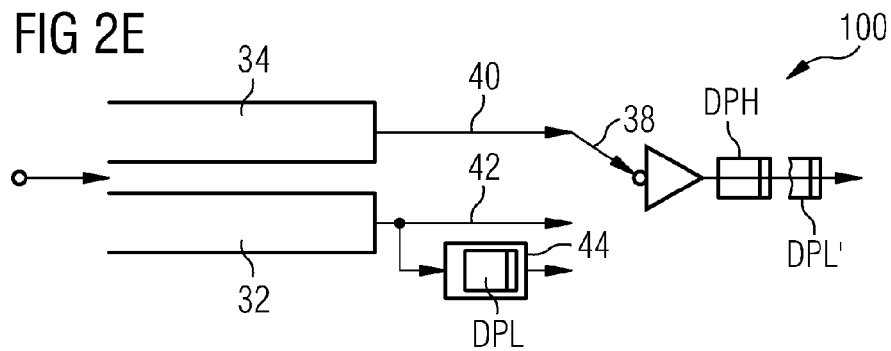
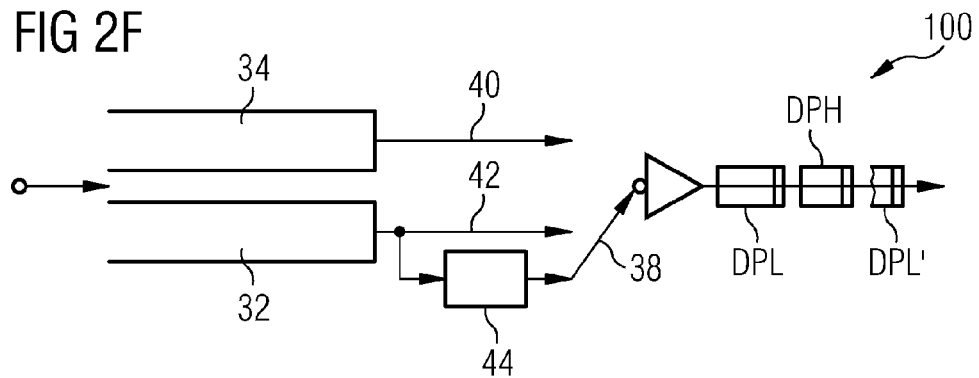

METHOD FOR TRANSFERRING DATA PACKETS IN A COMMUNICATION NETWORK AND SWITCHING DEVICE

CROSS-REFERENCE TO RELATED APPLICATIONS

This application is a U.S. National Stage Application of International Application No. PCT/EP2009/060852 filed Aug. 24, 2009, which designates the United States of America, and claims priority to DE Application No. 10 2008 039 580.3 filed Aug. 25, 2008. The contents of which are hereby incorporated by reference in their entirety.

TECHNICAL FIELD

The invention relates to a method for transferring data packets in a communication network, wherein first data packets having a low priority are transferred between a transmitter and a receiver of the communication network and wherein second data packets having a high priority compared to the first data packets are preferably transferred between the transmitter and the receiver. In the method, in a second data packet to be transferred from the transmitter to the receiver a check is performed to see whether presently a first data packet is being transferred. If the check as to whether a first data packet is being transferred presently is positive, the transfer of the first data packet is interrupted or stopped and the second data packet is then transferred. After the transfer of the second data packet, the transfer of the non-transferred first data packet is repeated or the rest of the incompletely transferred first data packet is transferred.

The invention also relates to a switching device for a communication network, comprising one or more data input(s) to which a respective transmitter may be connected, one or more data output(s) to which a respective receiver may be connected, and an evaluation unit which is connected to the data input(s) and is coupled by a respective transmitting device to the data output(s). The evaluation unit is adapted to receive and evaluate data packets present at the data input(s), to which of the data outputs a respective data packet is to be directed, and transfers the data packets to the accordingly assigned transmitting device. The respective transmitting device is adapted to check whether presently a first data packet is being transferred to the receiver connected to the transmitting device, and if the check as to whether a first data packet is being transferred presently is positive, to interrupt or stop the transfer of the first data packet, and the second data packet is then transferred, and after the transfer of the second data packet, to repeat the transfer of the non-transferred first data packet or to transfer the rest of the incompletely transferred first data packet.

BACKGROUND

When transferring data packets in a communication network they must be forwarded from a transmitting network node (transmitter) via one or more network node(s) (what are known as intermediate nodes) to a receiving network node (receiver). For this purpose each data packet comprises what is known as a header with control and routing information. A data packet also comprises a field for the payload in which the actual data is contained. Forwarding or transferring of data packets to a network node of the communication network is also called "packet switching". When a data packet is received the header thereof is evaluated in order to be able to determine to which additional network nodes of the communication network the data packet must be transferred. For this purpose it is necessary for each of the network nodes of the communication network to know the topology of the communication network to be able to determine the next network node, as a rule based on a routing table. This process applies in particular to communication networks which are designed as Ethernet communication networks. In principle this process is also applicable in other communication networks, however.

Basically, there is the problem when transferring data packets that data packets arriving at a switching device, a particular network node or a network node of the communication network that forwards the data packet, only being forwarded after a delay. The reason for this is that simultaneous processing of a large number of data packets at one switching device is not usually possible. The delay is caused in particular by reading out and evaluating the data contained in the header.

The situation can occur in this connection where immediately after the start of a data packet having a low priority, a data packet having a high priority, for example from a different network node, arrives at the switching device and this is to be transmitted to the same network node as the data packet having a low priority. Without special handling the data packet having a high priority must wait until the transfer of the data packet having a low priority has completely finished. This causes what is referred to as a packet jitter. There are applications which are critical with respect to jitter, for example time synchronization between a plurality of network nodes of the communication network to IEEE 1588, with accuracy in the range of a microsecond being required.

A generic method for transferring data packets in a communication network is known from US 2005/0175013 A1 for avoiding such a situation. In this method it is proposed that data packets having different priorities are stored in different output buffers to effect transfer as a function of the priority of these output buffers. In one scenario it is provided that transfer of a data packet having a low priority is stopped as soon as a data packet having a high priority exists in the corresponding output buffer. Only after the data packet having a high priority has been completely transferred to the receiver is transfer of the data packet having a low priority resumed. This process is called "pre-emption with retransmission service policy".

To simplify handling of data packets having a high priority in a switching device US 2005/0175013 A1 proposes putting an indicator bit in the header of the data packet, so data packets with an identification of this kind are given priority over other data packets. The method described in US 2005/0175013 A1 targets in particular the transfer of voice messages in a communication network working in accordance with the Internet protocol.

SUMMARY

According to various embodiments, a method for transferring data packets in a communication network can be provided in which the handling of data packets having a low priority is improved in the event of a transfer being stopped owing to a data packet to be transferred having a high priority.

Furthermore, according to other embodiments, a switching device can be provided which allows simplified handling of data packets having a low priority if their transfer was interrupted in the event of a data packet to be transferred having a high priority.

According to an embodiment, in a method for transferring data packets in a communication network, wherein first data packets having a low priority are transferred between a transmitter and a receiver of the communication network and wherein second data packets having a high priority compared to the first data packets are preferably transferred between the transmitter and the receiver,—for a second data packet to be transferred from the transmitter to the receiver, a check is performed to see whether presently a first data packet is being transferred,—if the check as to whether a first data packet is being transferred presently is positive,—the transfer of the first data packet is interrupted or stopped and the second data packet is then transferred,—after the transfer of the second data packet, the transfer of the non-transferred first data packet is repeated or the rest of the incompletely transferred first data packet is transferred, wherein—each first data packet is stored in an intermediate memory in parallel with a transmission and is only deleted from the intermediate memory after complete transfer of the first data packet to the receiver.

According to a further embodiment, a first data packet, whose transfer is repeated, can be read out from the intermediate memory and is completely transferred to the receiver. According to a further embodiment, in a first data packet, whose transfer to the receiver is incomplete, a check can be performed as to whether its header data is still valid, and if so the rest of the first data packet is transferred to the receiver. According to a further embodiment, before reading out the first data packet from the intermediate memory, a check may again be performed as to whether a second data packet to be transferred from the transmitter to the receiver exists. According to a further embodiment, the second data packets having a high priority can be identified using an identification date identifying the priority, or using their source or destination address. According to a further embodiment, the data packets having different priorities can be stored in different output buffers of a transmitting device, the data packets stored in the different output buffers being handled differently with respect to the time of sending to the receiver. According to a further embodiment, a data packet to be transferred may be completely received before the data packet is handled and forwarded to a determined data output of the transmitting device of the switching device. According to a further embodiment, a first or a second data packet can be immediately transferred to the receiver if no data packet is being transferred by the transmitting device to the receiver of the data packet when the relevant data packet is received. According to a further embodiment, in a second data packet to be transferred from the transmitter to the receiver a check can be performed as to whether presently a second data packet is being transferred, and, if the check as to whether a second data packet is being transferred presently is positive, the second data packet to be transferred is transferred following the presently transferred second data packet. According to a further embodiment, in a first data packet to be transferred from the transmitter to the receiver the first data packet to be transferred can be transferred following the presently transferred first or second data packet. According to a further embodiment, the second data packets having a high priority can be data packets which are critical with respect to jitter.

According to another embodiment, a switching device for a communication network may comprise—one or more data input(s) to which a respective transmitter may be connected,—one or more data output(s) to which a respective receiver may be connected,—an evaluation unit which is connected to the data input(s) and is coupled by a respective transmitting device to the data output(s),—wherein the evaluation unit is adapted to receive and evaluate data packets present at the data input(s), to which of the data outputs a respective data packet is to be directed, and transfers the data packets to the accordingly assigned transmitting device,— wherein the respective transmitting device is adapted to—check whether presently a first data packet is being transferred to the receiver connected to the transmitting device, and—if the check as to whether a first data packet is being transferred presently is positive,—to interrupt or stop the transfer of the first data packet, and the second data packet is then transferred, and—after the transfer of the second data packet, to repeat the transfer of the non-transferred first data packet or to transfer the rest of the incompletely transferred first data packet, wherein the switching device also comprises:—an intermediate memory in which each first data packet may be stored in parallel with a transmission and is only deleted from the intermediate memory after complete transfer of the first data packet to the receiver.

According to a further embodiment of the switching device, a respective transmitting device may have a first output buffer for first data packets having a low priority and a second output buffer for second data packets having a high priority, which buffers are coupled at the output side via a selecting device to the relevant data output respectively, data packets being stored as a function of their priority by a means for packet classification. According to a further embodiment of the switching device, the first output buffer can be connected at the output side to the intermediate memory which may be connected by the selecting device to the relevant data output for reading out.

BRIEF DESCRIPTION OF THE DRAWINGS

The invention will be described in more detail hereinafter with reference to an exemplary embodiment in the drawings, in which:

FIG. 1 shows a schematic diagram of a switching device according to various embodiments for a communication network, FIG. 2A to 2F each show a transmitting device, provided in the switching device, which illustrates implementation of the method according to various embodiments.

DETAILED DESCRIPTION

Figure 3:
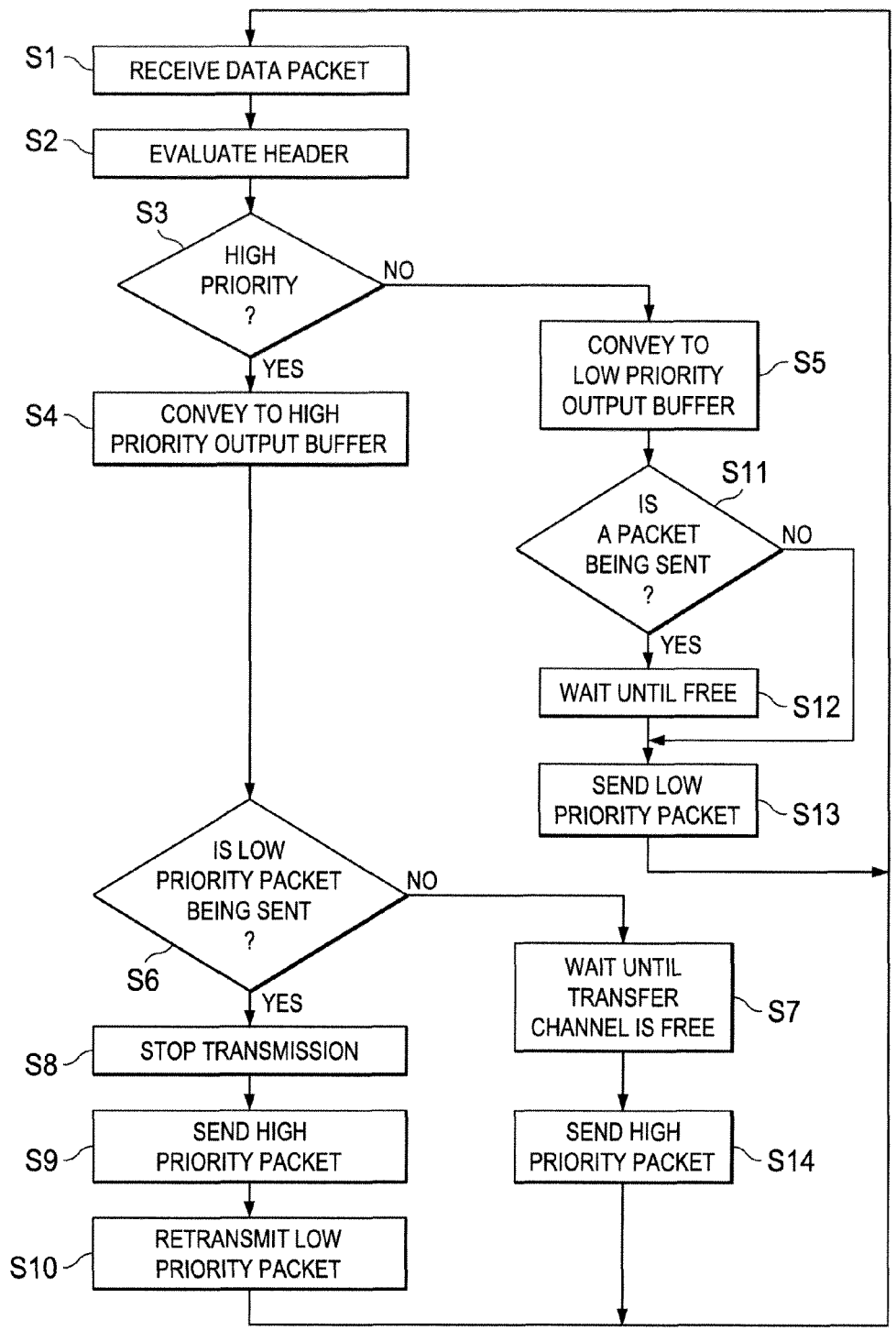
FIG. 3 shows a flow diagram of the method according to various embodiments.

According to an embodiment, in a method for transferring data packets in a communication network, first data packets having a low priority are transferred between a transmitter and a receiver of the communication network and wherein second data packets having a high priority compared to the first data packets are preferably transferred between the transmitter and the receiver. Where the present description mentions transfer of first data packets, this includes both complete data packets and fragments thereof. In the method, in a second data packet to be transferred from the transmitter to the receiver a check is performed to see whether presently a first data packet is being transferred. If the check as to whether a first data packet is being transferred presently is positive, the transfer of the first data packet is interrupted or stopped and the second data packet is then transferred. After the transfer of the second data packet, the transfer of the non-transferred first data packet is repeated or the rest of the incompletely transferred first data packet is transferred.

According to various embodiments, each first data packet is stored in an intermediate memory in parallel with a transmission and is only deleted from the intermediate memory after complete transfer of the first data packet to the receiver.

According to various embodiments, in a method for transferring data packets to a network node (receiver) of a communication network, it is irrelevant on which communication standard the communication network is based.

Providing an intermediate memory for storing the first data packet in parallel with its transmission to the receiver ensures that, in the event of transfer of the first data packet being stopped, the transfer may be repeated from the intermediate memory without any special measures. Providing an intermediate memory ensures that in the event of a repeated transfer, the first data packet can be transferred without delay. To avoid multiple transfer of the first data packet which has been repeatedly transmitted, the first data packet is deleted from the intermediate memory as soon as it has been completely received by the receiver. The method according to various embodiments has the advantage that it may be carried out with only slight changes to the hardware of a switching device.

According to an expedient embodiment of the method a first data packet, whose transfer is repeated, is read out from the intermediate memory and is completely transferred to the receiver. Consequently it is irrelevant at what time transfer of the first data packet having a low priority was stopped. It may thus be ensured in every case that the receiver is supplied with a complete first data packet.

In a further embodiment in a first data packet, whose transfer to the receiver is incomplete, a check is performed as to whether its header data is still valid, and if so the rest of the first data packet is transferred to the receiver. With this variant there is therefore no complete re-transfer of the first data packet. Instead only those parts which have not yet been transferred to the receiver since the transfer was stopped are transferred. So that this is possible it is necessary, however, for the header data in the switching device to still be valid.

Before reading out the first data packet from the intermediate memory, a check is expediently again performed as to whether a second data packet to be transferred from the transmitter to the receiver exists. This is intended to prevent a first data packet stored in the intermediate memory from being preferably transferred, the transfer of which packet has to be stopped again during the re-checking as to whether a second data packet having a high priority is to be transferred. It is consequently possible to optimize the transfer process as a whole.

According to a further embodiment the second data packets having a high priority are identified using an identification date identifying the priority, or using their source or destination address. The identification date identifying the priority may be represented by a pre-defined bit or byte in the data packet header. The identification of the second data packets having a high priority using their source or destination address has the advantage that the data packets do not have to be changed with respect to their data creation and their data length. Only an adjustment of the evaluation of the source or destination address with respect to priority is required.

According to a further embodiment the data packets having different priority are stored in different output buffers of a transmitting device, the data packets stored in the different output buffers being handled differently with respect to the time of sending to the receiver. It is sufficient in this connection if two different output buffers are provided, with the first data packets having a low priority being associated with one and the second data packets having a high priority being associated with the other. The output buffers may, for example, be implemented as FIFO (First In, First Out) buffers. Alternatively, the output buffers may also be implemented in a common memory with corresponding memory addressing. Respective data packets may easily be stored in the relevant output buffer by way of a means for packet classification.

It is expedient if a data packet to be transferred is completely received before handling of the data packet by way of forwarding to a determined data output of the transmitting device or the switching device takes place. This behavior is called "Store-and-Forward". The handling of the data packets includes reading out and evaluating the data in the header, and checking the integrity using a CRC (Cyclic Redundancy Check) value in the case of a communication network formed as an Ethernet, or the evaluation of a check sum. Based on the information in the header the data packet is conveyed via a bus or the switching device to the corresponding data output where the data packet is conveyed into the corresponding output buffer before transfer to the receiver.

It is also provided that a first or a second data packet is immediately transferred to the receiver if no data packet is being transferred by the transmitting device to the receiver of the data packet when the relevant data packet is received.

In a further embodiment, in a second data packet to be transferred from the transmitter to the receiver a check is performed as to whether presently a second data packet is being transferred, and, if the check as to whether a second data packet is being transferred presently is positive, the second data packet to be transferred is transferred following the presently transferred second data packet. This ensures that the transfer of a second data packet having a high priority is not stopped if an additional second data packet exists in the corresponding output buffer.

In a first data packet to be transferred from the transmitter to the receiver the first data packet to be transferred is transferred following the presently transferred first or second data packet.

The second data packets having a high priority are data packets which are critical with respect to jitter. In particular this may be data packets which, for example, are used for time synchronization of different network nodes of the communication network. It may, however, also be other data packets, such as voice or video data.

According to other embodiments, a switching device for a communication network comprises one or more data input(s) to which a respective transmitter may be connected. It also comprises one or more data output(s) to which a respective receiver may be connected. An evaluation unit is connected to the data output(s) and is coupled by a respective transmitting device to the data output(s). The evaluation unit is adapted to receive and evaluate data packets present at the data input(s), to which of the data outputs a respective data packet is to be directed, and transfers the data packets to the accordingly assigned transmitting device. The respective transmitting device is adapted to check whether presently a first data packet is being transferred to the receiver connected to the transmitting device. If the check as to whether a first data packet is being transferred presently is positive, the transfer of the first data packet is interrupted or stopped and the second data packet is then transferred. After the transfer of the second data packet, the transfer of the non-transferred first data packet is repeated or the rest of the incompletely transferred first data packet is transferred by the transmitting device. The switching device is characterized in that an intermediate memory is provided in which each first data packet may be stored in parallel with a transmission and is only deleted from the intermediate memory after complete transfer of the first data packet to the receiver.

The same advantages are associated therewith as have been described above in connection with the method according to various embodiments.

According to an expedient embodiment a respective transmitting device has a first output buffer for first data packets having a low priority and a second output buffer for second data packets having a high priority, which buffers are coupled at the output side via a selecting device to the relevant data output respectively, data packets being stored as a function of their priority by a means for packet classification.

It is also expedient if the first output buffer is connected at the output side to the intermediate memory which may be connected by the selecting device to the relevant data output. In other words, this means that the intermediate memory is arranged parallel to the output of the output buffer and the data output of the switching device, so a first data packet is stored in the intermediate memory in parallel with transfer thereof. In the event of transfer of the first data packet to the receiver being stopped, the transfer can be repeated by reading out from the intermediate memory. The intermediate memory can be provided in the switching device as a separate memory. The intermediate memory can, however, also be provided by allocating a certain memory sector in the memory of the output buffers.

Figure 4:
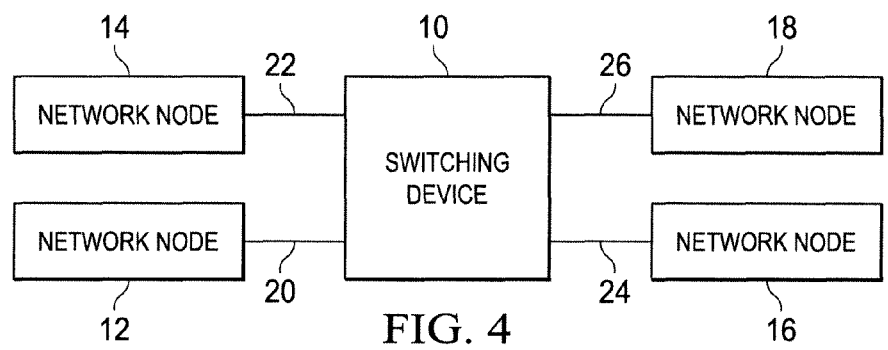
FIG. 4 shows a schematic diagram of a simple communication network in which the according to various embodiments can be applied.

FIG. 4 shows in a simplified manner a situation underlying the various embodiments. A communication network having five network nodes is shown. Numeral 10 designates a switching device according to various embodiments which is communicatively connected to four network nodes 12, 14, 16, 18. The transfer of data based on data packets may, in principle, take place in any desired manner using known communication protocols. The communication between the individual network nodes may be contactless or contact-based. The network nodes formed in the communication network may be of identical construction, so a transmitter of data packets may also be a receiver of data packets. Depending on the type and construction of the communication network the switching device 10 may be used solely for forwarding and conveying data packets between specific transmitters and receivers. In other communication networks the switching device 10 may itself also be a transmitter and/or receiver of the communication network.

The constructional type and form of the communication network is of secondary importance to the present invention. To facilitate understanding of the invention it will hereinafter be assumed that the network nodes 12 and 14 are transmitters and that network nodes 16 and 18 are receivers of the communication network, the data packets being conveyed via the switching device 10. In the exemplary embodiment of FIG. 4 the transmitter 12 is connected to a data input 20 of the switching device 10. The transmitter 40 is accordingly connected to a data input 22. The receivers 16 and 18 are connected to the switching device 10 via data outputs 24, 26 thereof.

FIG. 1 schematically shows the construction of the switching device 10 according to various embodiments. The data inputs 20, 22 are connected to an evaluation unit 30. The headers of the data packets received at the data inputs 20, 22 are evaluated in the evaluation unit 30. Evaluation takes place as soon as a data packet present at one of the data inputs 20, 22 is completely received by the evaluation unit 30. This is called "Store-and-Forward". Analysis of the data contained in the header is based on checking the integrity of the data packet which may be performed on the basis of a CRC (Cyclic Redundancy Check) in the case of an Ethernet communication network, or other check sums. Based on the information contained in the header of a data packet the data packet is forwarded to one of the data outputs 24 or 26. As may readily be seen from FIG. 1, forwarding of the data packets to the data outputs 24, 26 is not immediate. Instead each one of the data outputs 24, 26 is coupled via a respective transmitting device 100, 102 to outputs of the evaluation unit 30. Each of the transmitting devices 100, 102 associated with a data output basically have an identical construction.

Each of the transmitting devices 100, 102 comprises two output buffers 32, 34 and 52, 54 which are connected by a respective means for packet classification 36 or 56 to outputs of the evaluation unit 30. The output buffers 32 and 52 are data buffers for the first data packets having a low priority. First data packets having a low priority are all those data packets whose transfer is non-time critical. The output buffers 34 and 54 are output memories for second data packets having a high priority. Second data packets having a high priority are those data packets which are critical, for example with respect to jitter.

Respective outputs of the output buffers 32, 34 and 52, 54 are connected via data lines 40, 42 and 60, 62 to a respective selecting device 38 or 58 which can connect a data line to the relevant data output 24 or 26. In addition the output buffers 32 and 52 are connected at the output side to an intermediate memory 44 or 64 for the first data packets having a low priority. The intermediate memory 44 or 64 can also be connected by the respective selecting device 38 or 58 to the data output 24 or 26 as an alternative to the data lines 40, 42 and 60, 62. The selecting device 38 or 58 is constructed in such a way that only one of the data lines 40 or 42 or the output of the intermediate memory 44 or 60 06 62 or the output of the intermediate memory 64 may be connected to the data output 24 or 26.

The switching device 10 described in FIG. 1 allows the preferred handling of the second data packets having a high priority. This makes it possible to reduce delays when transferring the second data packets having a high priority.

A special priority (for example VLAN 802.1 Q/p for Ethernet, Type of Service (TOS) for communications according to Internet protocol IP) may be allocated to the second data packets to identify them. The second, higher ranking data packets may also be identified on the basis of their source or destination address, which is contained in the header data of the data packet.

The identification as to whether a data packet having a low or high priority is present at the data input 20 or 22 is made by the evaluation unit 30. Once the evaluation unit 30 has determined to which of the data outputs 24, 26 the relevant data packet is to be transferred, the data packet is stored as a function of the determined priority either in the output buffer 32 or 52 in the case of a determined low priority or the output buffer 34 or 54 in the case of a determined high priority. The output buffers 32, 34 and 52, 54 may be constructed as First In, First Out (FIFO) buffers. Implementation in the form of a common memory and corresponding memory management is also possible.

Sending the in the output buffer(s) 32 and/or 34 and 52 and/or 54 takes place by means of a controller (not shown in detail in FIG. 1), for example a scheduler. This process will be described in more detail hereinafter with reference to FIG. 2A to 2F. For simplification only the transmitting device 100 which is associated with data output 24, is shown.

In FIG. 2A, following evaluation of a data packet and determination of the priority, a first data packet DPL having a low priority was stored in output buffer 32. As presently no additional data packet is present in output buffer 34 for data packets having a high priority, data line 42 is connected to data output 24 by the selecting device 34. Data packet DPL can therefore be transferred to the receiver in output buffer 32. In parallel with the transfer of the first data packet DPL to data output 24, the first data packet DPL is stored in the intermediate memory 44 (cf. FIG. 2B).

It is assumed that during transfer of the first data packet DPL a second data packet DPH was stored in output buffer 34. This is shown as an example in FIG. 2C. Transfer of the hitherto only partially transferred first data packet DPL' is then stopped. Stoppage of the transfer of the first data packet DPL' is shown by the zigzag line in FIG. 2D. The fragment of the first data packet DPL already transferred to the receiver is identified in the figure by DPL'.

Immediately after transfer of the first data packet DPL has been stopped, the data line 40 is connected to the data output 24 by the selecting device 38, whereby the second data packet DPH having a high priority can be transferred from the output buffer 34 to the receiver. Once the second data packet DPH has been completely transferred to the receiver (cf. FIG. 2E) the intermediate memory 44 is connected to the data output 24 by the selecting device 38, so the first data packet DPL incompletely transferred to the receiver is read out from the intermediate memory 44 and may be transferred to the receiver. Before reading out and transferring the first data packet DPL from the intermediate memory 44 an additional check is preferably performed to see whether the output buffer 34 in the meantime contains an additional second data packet having a high priority.

The procedure is graphically shown again in FIG. 3. A data packet is received in step S1. In step S2 the header of the data packet is evaluated to determine to which data output the data packet must be conveyed. Evaluation also includes determining whether the data packet has a high or low priority. In step S3 it is checked whether the data packet has a high priority. If this is the case the data packet is conveyed in step S4 into an output buffer for data packets having a high priority. If the priority of the data packet is low then it is conveyed according to step S5 into an output buffer for data packets having a low priority. In step S6 a check is performed as to whether a data packet having a low priority is currently being sent. If this is the case transmission of the data packet having a low priority is stopped in step S8. Immediate sending of the data packet having a high priority then follows in step S9. In step S10 the data packet having a low priority is transmitted again. If it was determined in step S6 that no data packet having a low priority is being sent, there is then a wait according to step S7 until the transfer channel is optionally free. Sending according to the data packet having a high priority subsequently or immediately takes place according to step S14. Finally a check is again performed in step S1 to see whether a new data packet is being received.

If the data packet received by the switching device is a data packet having a low priority (step S5) a check is performed in step S11 as to whether a data packet (having a high or low priority) is currently being sent. If this is the case, according to step S12 there is a wait until the transfer channel is free in order to then send the data packet having a low priority in step S13. If the check in step S11 showed that the transfer channel is free, the data packet having low priorities is sent immediately according to step S13. A check is again then performed as to whether a data packet has been received (step S1).

It is also advantageous if a check is performed in an idle state or once a data packet has been sent to see whether a data packet having a high priority is present in the corresponding output buffer, in particular before data packets having a low priority are sent.

In the "store-and-forward" mode already mentioned incomplete first data packets having a low priority, whose transfer was stopped, are discarded. This is because the data structure is no longer valid, and owing to the header no longer existing in the switching device it is no longer possible to transfer the rest of the data. Discarding the rest of the first data packet which has not yet been transferred is performed with the aid of the check that the length of the rest no longer matches the conventional length of a data packet or is not a multiple of a whole byte or no longer matches the determined CRC value.

In contrast thereto, in what is known as "cut-through" mode an incomplete packet or the rest of the incomplete packet is forwarded for as long as the header is valid. This is possible as only the header is evaluated and no CRC value is determined. The data packet is optionally discarded by the receiver.

The quality of service (QoS) in relation to a minimized variable delay may be optimized according to various embodiments. In particular the total delay of prioritized data packets due to stoppage of transfer of normal data packets (i.e. data packets having a low priority) may be improved. This facilitates immediate forwarding of jitter-critical data packets in relation to synchronization, delayed responses or IEEE 1588 protocol messages. These data packets contain time information in order to synchronize clocks of receivers (slaves) with clocks of a master network node. A variable delay in data packets destroys the time information and prevents accurate time information.

Buffering the first data packets having a low priority during their transfer to the receiver facilitates repeated transfer in the event of a transfer being stopped.

The complete repeated transfer of data packets having a low priority allows integration in existing switching devices. In particular no modification of a transfer protocol is necessary.

An advantage of the various embodiments lies in a minimization of point-to-point jitter and the minimization of the total delay of high-priority data packets irrespective of an application or the transfer protocol used. As long as data packets having a high priority do not have to wait in their corresponding output buffer for a transfer owing to the data transfer of data packets having a low priority being stopped, jitter may be minimized to virtually zero, with a constant time until stoppage of transfer of the data packet having a low priority being assumed.

What is claimed is:

1. A method for transferring data packets in a communication network, wherein first data packets having a low priority are transferred between a transmitter and a receiver of the communication network and wherein second data packets having a high priority compared to the first data packets are preferably transferred between the transmitter and the receiver, the method comprising:

for a first data packet to be transferred from the transmitter to the receiver, receiving the first data packet in a first data packet output buffer, setting a switch to connect a data output of the transmitter to an output end of the first data packet output buffer, and transferring the first packet from the output end of the first data packet output buffer to the data output of the transmitter, in parallel with transferring the first packet from the output end of the first data packet output buffer to the data output of the transmitter, storing the first packet in an intermediate memory connected to the output end of the first data packet output buffer, for a second data packet to be transferred from the transmitter to the receiver, receiving the second data packet in a second data packet output buffer and performing a check to see whether presently the first data packet is being transferred, if the check as to whether the first data packet is being transferred presently is positive, then interrupting or stopping the transfer of the first data packet and then transferring the second data packet, after the transfer of the second data packet, setting the switch to connect the data output of the transmitter to an output end of the intermediate memory and transferring the non-transferred first data packet or transferring the rest of the incompletely transferred first data packet from the intermediate memory to the data output of the transmitter without passing through the first data packet output buffer.

2. The method according to claim 1, wherein the first data packet, whose transfer is repeated, is read out from the intermediate memory and is completely transferred to the receiver.

3. The method according to claim 1, wherein in the first data packet, whose transfer to the receiver is incomplete, a check is performed as to whether its header data is still valid, and if so the rest of the first data packet is transferred to the receiver.

4. The method according to claim 1, wherein before reading out the first data packet from the intermediate memory, a check is again performed as to whether a second data packet to be transferred from the transmitter to the receiver exists.

5. The method according to claim 1, wherein the second data packets having a high priority are identified using an identification date identifying the priority, or using their source or destination address.

6. The method according to claim 1, wherein a data packet to be transferred is completely received before the data packet is handled and forwarded to a determined data output of the transmitting device of the switching device.

7. The method according to claim 1, wherein a first or a second data packet is immediately transferred to the receiver if no data packet is being transferred by the transmitting device to the receiver of the data packet when the relevant data packet is received.

8. The method according to claim 1, wherein in a second data packet to be transferred from the transmitter to the receiver a check is performed as to whether presently a second data packet is being transferred, and, if the check as to whether a second data packet is being transferred presently is positive, the second data packet to be transferred is transferred following the presently transferred second data packet.

9. The method according to claim 1, wherein in a first data packet to be transferred from the transmitter to the receiver the first data packet to be transferred is transferred following the presently transferred first or second data packet.

10. The method according to claim 1, wherein the second data packets having a high priority are data packets which are critical with respect to jitter.

11. A switching device for a communication network, comprising:
one or more data input(s) to which a respective transmitter may be connected,
one or more data output(s) to which a respective receiver may be connected,
an evaluation unit which is connected to the data input(s) and is coupled by a respective transmitting device to the data output(s),
wherein the evaluation unit is adapted to receive and evaluate data packets present at the data input(s), to which of the data outputs a respective data packet is to be directed, and transfers the data packets to the accordingly assigned transmitting device,
each respective transmitting device comprising:
a first data packet output buffer configured to receive from the evaluation unit first data packets having a low priority,
an intermediate memory connected to the first data packet output at buffer,
a switch configured to selectively connect a first data output to either (a) an output end of the first data packet output buffer or (b) an output end of the intermediate memory, and
a second data packet output buffer configured to receive from the evaluation unit second data packets having higher priority, and
wherein the respective transmitting device is adapted to:
receive a first data packet in the first data packet output buffer from the evaluation unit,
set the switch to connect the first data output to the output end of the first data packet output buffer, and transfer the first packet from the first data packet output buffer to the first data output,
in parallel with transferring the first packet from the output end of the first data packet output buffer to the first data output, storing the first packet in the intermediate memory,
receive a second data packet in the second data packet output buffer from the evaluation unit,
check whether presently a first data packet is being transferred to the receiver connected to the transmitting device, and
if the check as to whether a first data packet is being transferred presently is positive,
to interrupt or stop the transfer of the first data packet, and then transfer a second data packet, and
after the transfer of the second data packet, setting the switch to connect the first data output to the output end of the intermediate memory and transferring the non-transferred first data packet or to transfer the rest of the incompletely transferred first data packet from the intermediate memory to the first data output without passing through the first data packet output buffer.

12. The switching device according to claim 11, wherein the first output buffer is connected at the output side to the intermediate memory which may be connected by the selecting device to the relevant data output for reading out.

13. A system for transferring data packets comprising:
a communication network, comprising:
a transmitter comprising an intermediate memory; and
a receiver;
wherein first data packets having a low priority are transferred between the transmitter and the receiver and wherein second data packets having a high priority compared to the first data packets are preferably transferred between the transmitter and the receiver, the system being configured:
for a first data packet to be transferred from the transmitter to the receiver:
to receive the first data packet in a first data packet output buffer, to set a switch to connect a data output of the transmitter to an output end of the first data packet output buffer, and transferring the first packet from the output end of the first data packet output buffer to the data output of the transmitter, in parallel with transferring the first packet from the output end of the first data packet output buffer to the data output of the transmitter, to store the first packet in an intermediate memory connected to the output end of the first data packet output buffer, for a second data packet to be transferred from the transmitter to the receiver:

to receive the second data packet in a second data packet output buffer and to check whether presently a first data packet is being transferred, and if yes, then to interrupt or stop the transfer of the first data packet and then transferring, the second data packet, after the transfer of the second data packet, setting the switch to connect the data output of the transmitter to an output end of the intermediate memory and transferring, the non-transferred first data packet or to continue an interrupted transfer of the first data packet from the intermediate memory to the data output of the transmitter without passing through the first data packet output buffer.

14. The system according to claim 13, wherein a first data packet, whose transfer is repeated, is read out from the intermediate memory and is completely transferred to the receiver.

15. The system according to claim 13, wherein in the first data packet, whose transfer to the receiver is incomplete, a check is performed as to whether its header data is still valid, and if so the rest of the first data packet is transferred to the receiver.

16. The system according to claim 13, wherein before reading out the first data packet from the intermediate memory, a check is again performed as to whether a second data packet to be transferred from the transmitter to the receiver exists.

17. The system according to claim 13, wherein the second data packets having a high priority are identified using an identification date identifying the priority, or using their source or destination address.

* * * * *